US012627181B2

(12) United States Patent
Hiratsuka et al.

(10) Patent No.: US 12,627,181 B2
(45) Date of Patent: May 12, 2026

(54) MOTOR APPARATUS, COMPRESSOR, AND REFRIGERATION APPARATUS

(71) Applicant: DAIKIN INDUSTRIES, LTD., Osaka (JP)

(72) Inventors: Daisuke Hiratsuka, Osaka (JP); Hiroshi Hibino, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 339 days.

(21) Appl. No.: 18/126,694

(22) Filed: Mar. 27, 2023

(65) Prior Publication Data

US 2023/0238840 A1 Jul. 27, 2023

Related U.S. Application Data

(63) Continuation of application No. PCT/JP2021/035859, filed on Sep. 29, 2021.

(30) Foreign Application Priority Data

Sep. 29, 2020 (JP) ................................. 2020-163277

(51) Int. Cl.
*H02K 1/18* (2006.01)
*F25B 31/02* (2006.01)
*H02K 21/16* (2006.01)

(52) U.S. Cl.
CPC ............. *H02K 1/185* (2013.01); *F25B 31/02* (2013.01); *H02K 21/16* (2013.01)

(58) Field of Classification Search
CPC ............ H02K 21/16; H02K 1/30; H02K 5/24; H02K 15/02; H02K 1/185; H02K 5/12; H02K 7/14; F25B 31/02

USPC .................................................... 310/216.113
See application file for complete search history.

(56) References Cited

U.S. PATENT DOCUMENTS

| | | | | |
|---|---|---|---|---|
| 6,517,328 | B2 * | 2/2003 | Makino | H02K 7/14 |
| | | | | 417/410.5 |
| 7,044,640 | B2 * | 5/2006 | Shishido | F16C 17/107 |
| 7,986,068 | B2 * | 7/2011 | Suzuki | H02K 1/276 |
| | | | | 310/156.22 |
| 8,035,271 | B2 * | 10/2011 | Sano | H02K 1/185 |
| | | | | 310/216.049 |

(Continued)

FOREIGN PATENT DOCUMENTS

| | | |
|---|---|---|
| JP | 4-105529 A | 4/1992 |
| JP | 8-275470 A | 10/1996 |

(Continued)

OTHER PUBLICATIONS

International Preliminary Report of corresponding PCT Application No. PCT/JP2021/035859 dated Apr. 13, 2023.

(Continued)

*Primary Examiner* — Alex W Mok
(74) *Attorney, Agent, or Firm* — Spencer Fane LLP

(57) ABSTRACT

A motor apparatus includes a casing, a stator disposed in the casing, a rotor disposed on an inner circumference of the stator, a shaft disposed on an inner circumference of the rotor, a functional part disposed on an outer circumference of a first member, and a heat-resistant part disposed between the functional part and a second member. The first member is the stator or the shaft. The second member is the casing or the rotor.

17 Claims, 10 Drawing Sheets

(56)　　　　　　References Cited

U.S. PATENT DOCUMENTS

| 2001/0038797 | A1* | 11/2001 | Makino | .................... | H02K 7/14 |
| | | | | | 417/410.3 |
| 2009/0315423 | A1* | 12/2009 | Suzuki | ................... | H02K 1/276 |
| | | | | | 310/156.12 |
| 2010/0007236 | A1* | 1/2010 | Sano | ...................... | H02K 1/148 |
| | | | | | 310/216.135 |
| 2013/0106212 | A1* | 5/2013 | Nakazumi | .............. | H02K 9/227 |
| | | | | | 310/52 |
| 2015/0345485 | A1 | 12/2015 | Kinjo et al. | | |
| 2019/0319509 | A1* | 10/2019 | Ishikawa | ................ | H02K 21/14 |

FOREIGN PATENT DOCUMENTS

| JP | 61-258635 | A | | 11/1996 | | |
| JP | 2001-289173 | A | | 10/2001 | | |
| JP | 2009-177946 | A | | 8/2009 | | |
| JP | 2013-150506 | A | | 8/2013 | | |
| JP | 5560007 | B2 | | 6/2014 | | |
| JP | 2021058082 | A | * | 4/2021 | ............ | F04C 23/008 |
| WO | 2014/017051 | A1 | | 1/2014 | | |

OTHER PUBLICATIONS

International Search Report of corresponding PCT Application No. PCT/JP2021/035859 dated Dec. 14, 2021.
European Search Report of corresponding EP Application No. 21 87 5693.0 dated Sep. 16, 2024.

* cited by examiner

64(60)

20    12    11

64  62

20    12  11 60

15

20    12  11    64
             (60)

MOTOR APPARATUS, COMPRESSOR, AND REFRIGERATION APPARATUS

CROSS-REFERENCE TO RELATED APPLICATIONS

This is a continuation of International Application No. PCT/JP2021/035859 filed on Sep. 29, 2021, which claims priority to Japanese Patent Application No. 2020-163277, filed on Sep. 29, 2020. The entire disclosures of these applications are incorporated by reference herein.

BACKGROUND

Technical Field

The present disclosure relates to a motor apparatus, a compressor, and a refrigeration apparatus.

Background Art

Japanese Unexamined Patent Application Publication No. 2001-289173 discloses a compressor in which an electric motor is accommodated in a container together with a compression mechanism. In this compressor, a non-conductive material is provided between a stator of the electric motor and the container to prevent contact between the stator and the container.

SUMMARY

A first aspect of the present disclosure relates to a motor apparatus. The motor apparatus includes a casing, a stator disposed in the casing, a rotor disposed on an inner circumference of the stator, a shaft disposed on an inner circumference of the rotor, a functional part disposed on an outer circumference of a first member, and a heat-resistant part disposed between the functional part and a second member. The first member is the stator or the shaft. The second member is the casing or the rotor.

DETAILED DESCRIPTION OF EMBODIMENT(S)

Figure 1:
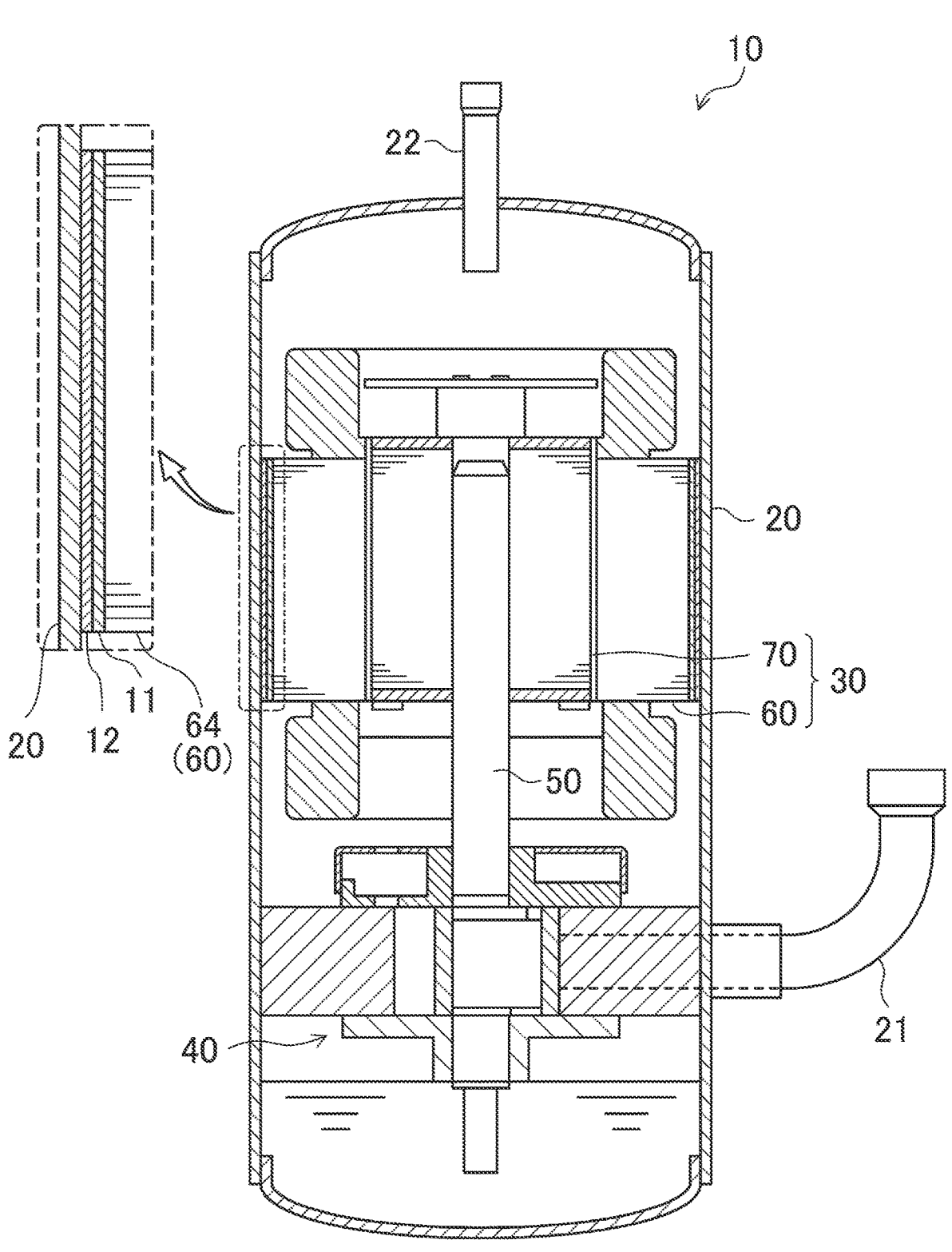
FIG. 1 is a longitudinal sectional view illustrating an example of a motor apparatus according to a first embodiment.

Embodiments will be described below in detail with reference to the drawings. In the drawings, the same or corresponding parts are denoted by the same reference numerals, and description thereof will not be repeated.

First Embodiment

Figure 2:
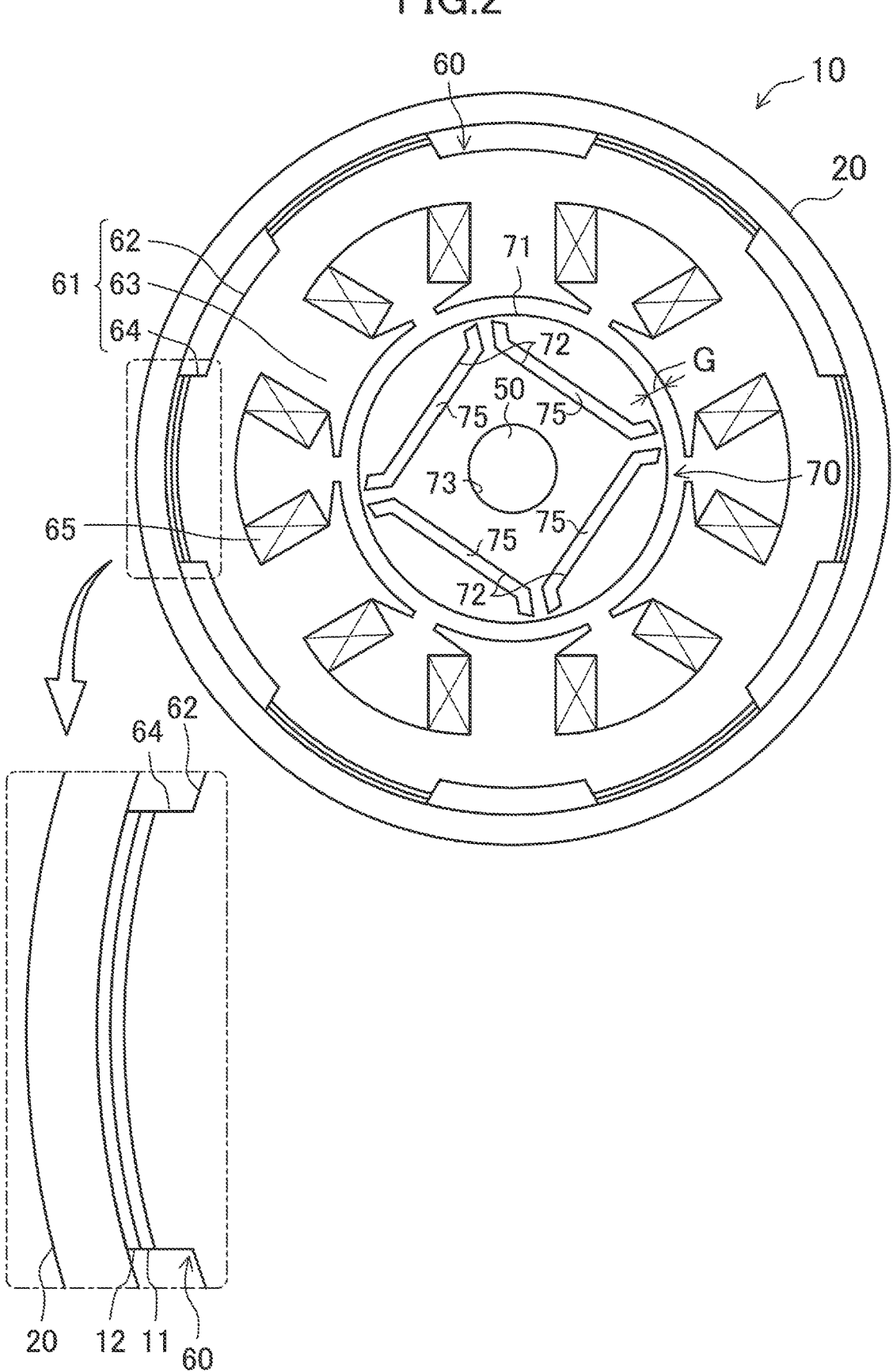
FIG. 2 is a transverse sectional view illustrating an example of the motor apparatus according to the first embodiment.

FIG. 1 and FIG. 2 illustrate an example of a configuration of a motor apparatus (10) according to a first embodiment. Hatching is omitted in FIG. 2. The motor apparatus (10) includes a casing (20) and a motor (30). In this example, the motor apparatus (10) forms a compressor that compresses a fluid. The motor apparatus (10) is provided in a refrigerant circuit of an air conditioner to compress a refrigerant. In other words, the compressor includes a compression mechanism (40) and the motor apparatus (10). The motor apparatus (10) may be provided in a device other than the air conditioner.

In this example, the motor apparatus (10) includes the compression mechanism (40) and a shaft (50) in addition to the casing (20) and the motor (30). The shaft (50) couples the motor (30) and the compression mechanism (40) to each other.

Casing

The casing (20) accommodates components of the motor apparatus (10). In this example, the casing (20) is formed in a cylindrical shape extending in the up-down direction and having both ends closed. The inner circumference surface of the casing (20) is a cylindrical surface. The casing (20) accommodates the motor (30), the compression mechanism (40), and the shaft (50). The shaft (50) extends in the up-down direction. The motor (30) is disposed above the compression mechanism (40).

In this example, the casing (20) is provided with a suction pipe (21) and a discharge pipe (22). The suction pipe (21) is formed through a body portion of the casing (20) and is coupled to the compression mechanism (40). The discharge pipe (22) is formed through an upper portion of the casing (20) and communicates with an internal space of the casing (20).

Motor

The motor (30) drives and rotates the shaft (50). The drive and rotation of the shaft (50) drives the compression mechanism (40). In this example, the motor (30) drives the shaft (50) to rotate in only one direction.

Compression Mechanism

The compression mechanism (40) compresses a fluid. In this example, the compression mechanism (40) compresses the refrigerant sucked through the suction pipe (21) and discharges the compressed refrigerant into the internal space of the casing (20). The refrigerant discharged into the internal space of the casing (20) is discharged through the discharge pipe (22). In this example, the compression mechanism (40) is a rotary type compression mechanism.

Configuration of Motor

The motor (30) includes a stator (60) and a rotor (70).

In the following description, an "axial direction" refers to a direction of an axis of the stator (60) (center of rotation of the rotor (70)). A "radial direction" refers to a direction orthogonal to the direction of the axis of the stator (60). A "circumferential direction" refers to a direction around the axis of the stator (60). A "longitudinal section" refers to a section along the axial direction, and a "transverse section" refers to a section orthogonal to the axial direction.

The stator (60) is accommodated in the casing (20). The rotor (70) is disposed on the inner side of the stator (60) in the radial direction with a gap (G) therebetween. In this example, the motor (30) is an interior magnet motor.

Stator

The stator (60) includes a stator core (61) and a coil (65).

The stator core (61) includes a back yoke (62), teeth (63), and protruding sections (64). In this example, six teeth (63) and six protruding sections (64) are provided. The stator core (61) is a laminated core. Specifically, the stator core (61) is formed by stacking, in the axial direction, a plurality of electromagnetic steel plates, each of which is formed in a substantially annular shape.

The back yoke (62) is formed in a substantially cylindrical shape.

The teeth (63) extend inward in the radial direction from the inner circumference surface of the back yoke (62). In this example, the six teeth (63) are arranged at an equal pitch (specifically, a pitch of 60° μ) in the circumferential direction.

The protruding sections (64) protrude outward in the radial direction from the outer circumference surface of the back yoke (62). In this example, the outer circumference surface of the protruding sections (64) is an arc surface. The six protruding sections (64) are arranged at an equal pitch (specifically, a pitch of 60°) in the circumferential direction.

The coil (65) is wound around the teeth (63). In this example, the coil (65) is wound around the teeth (63) by concentrated winding.

Rotor

The rotor (70) is provided on the inner circumference of the stator (60). The rotor (70) includes a rotor core (71) and permanent magnets (75). In this example, four permanent magnets (75) are provided.

The rotor core (71) is provided with slots (72) and a shaft hole (73). In this example, four slots (72) corresponding to the four permanent magnets are provided. The rotor core (71) is a laminated core. Specifically, the rotor core (71) is formed by stacking, in the axial direction, a plurality of electromagnetic steel plates, each of which is formed in a substantially circular shape.

The slots (72) accommodate the permanent magnets (75). In this example, the four slots (72) are arranged at an equal pitch (specifically, a pitch of 90°) in the circumferential direction.

The shaft hole (73) is formed through a center portion of the rotor core (71) in the axial direction. The shaft (50) is inserted and fixed in the shaft hole (73). The shaft (50) is provided on the inner circumference of the rotor (70).

The permanent magnets (75) form magnetic poles of the rotor (70). In this example, the four permanent magnets (75) are accommodated in the four slots (72), thereby forming four magnetic poles. The permanent magnets (75) are each a sintered magnet.

Functional Parts and Heat-Resistant Parts

The motor apparatus (10) includes functional parts (11) and heat-resistant parts (12) in addition to the above-described configuration. In this example, six functional parts (11) corresponding to the six protruding sections (64) of the stator (60) and six heat-resistant parts (12) corresponding to the six functional parts (11) are provided. The stator (60), the functional parts (11), and the heat-resistant parts (12) of the motor (30) are fastened by shrink-fitting the casing (20). A method of manufacturing the motor apparatus (10) including the shrink fitting and the like will be described in detail below.

Functional Parts

The functional parts (11) are provided on the outer circumference of a first member that is the stator (60) or the shaft (50). In this example, the functional parts (11) are provided on the outer circumference of the stator (60). The functional parts (11) are in contact with the stator (60). The stator (60) is an example of the first member.

In this example, the functional parts (11) each cover the outer circumference surface of the corresponding protruding section (64) of the stator (60). Specifically, the functional part (11) extends in the axial direction along the outer circumference surface of the protruding section (64). The functional part (11) also extends in the circumferential direction along the outer circumference surface of the protruding section (64). The transverse section of the functional part (11) has an arc shape.

Note that the functional part (11) may be larger or smaller than the protruding section (64). For example, the functional part (11) may have a surface area (area of a portion in contact with the protruding section (64)) that is larger or smaller than the area of the outer circumference surface of the protruding section (64).

The functional part (11) has at least one of a function of insulating the stator (60) and the casing (20) from each other, and a function of suppressing transmission of vibration between the stator (60) and the casing (20). Such a configuration can achieve at least one of the insulation between the stator (60) and the casing (20) and the suppression of transmission of vibration between the stator (60) and the casing (20).

Hereinafter, the function of insulating the stator (60) and the casing (20) from each other is referred to as a "first function", and the function of suppressing transmission of vibration between the stator (60) and the casing (20) is referred to as a "second function".

Examples of a material forming the functional part (11) having the first function include a non-conductive material. Examples of the non-conductive material include resin, ceramic, and the like. Examples of the resin forming the functional part (11) having the first function include polyphenylene sulfide (PPS) resin, liquid crystal polymer (LCP) resin, polybutylene terephthalate (PBT) resin, epoxy resin, phenol resin, and the like. Examples of the ceramic forming the functional part (11) having the first function include alumina, glass, zirconia, and the like.

Examples of the material forming the functional part (11) having the second function include a vibration-damping material, a vibration-proof material, and the like. Examples of the vibration-damping material and the vibration-proof material include resin, rubber, and the like. Examples of the resin forming the functional part (11) having the second function include epoxy resin, polyamide resin, polyurethane resin, silicone resin, foams of those resins, and the like. Examples of the rubber forming the functional part (11)

having the second function include a vibration-proof rubber, a synthetic rubber, and the like.

Heat-Resistant Parts

The heat-resistant parts (12) are each provided between the corresponding functional part (11) and a second member that is the casing (20) or the rotor (70). In this example, the heat-resistant part (12) is provided between the casing (20) and the functional part (11). The heat-resistant part (12) is in contact with both the casing (20) and the functional part (11). The heat-resistant part (12) prevents contact between the casing (20) and the functional part (11). The casing (20) is an example of the second member. The combination of the stator (60) and the casing (20) is an example of a combination of the first member and the second member.

In this example, the heat-resistant part (12) covers the outer circumference surface of the functional part (11). Specifically, the heat-resistant part (12) extends in the axial direction along the outer circumference surface of the functional part (11). The heat-resistant part (12) extends in the circumferential direction along the outer circumference surface of the functional part (11). The transverse section of the heat-resistant part (12) has an arc shape. The heat-resistant part (12) does not necessarily cover the entire surface (the entire outer circumference surface) of the functional part (11).

Note that the heat-resistant part (12) may be larger or smaller than the functional part (11). For example, the heat-resistant part (12) may have a surface area (area of a portion in contact with the functional part (11)) that is larger or smaller than the surface area of the functional part (11). The heat-resistant part (12) may be larger or smaller than the protruding section (64) of the stator (60).

In this example, the stator (60), the functional part (11), and the heat-resistant part (12) are fastened by shrink-fitting the casing (20). The temperature of heat denaturing the heat-resistant part (12) is higher than the temperature for shrink fitting. The temperature of heat denaturing the heat-resistant part (12) is the temperature of heat causing deformation, melting, decomposition, or the like of the heat-resistant part (12). Examples of the temperature of heat causing deformation, melting, decomposition, or the like include a melting point, a decomposition temperature, or the like. In this example, the melting point or the decomposition temperature of the heat-resistant part (12) is higher than the shrink fitting temperature. Such a configuration can suppress deterioration of the heat-resistant part (12) due to heat applied during the shrink fitting.

Examples of the material forming the heat-resistant part (12) include metal, thermosetting resin, and the like. The metal forming the heat-resistant part (12) preferably has a high melting point. Examples of the metal forming the heat-resistant part (12) include iron, aluminum, and the like. The iron may be cast iron or carbon steel. Preferably, thermal conductivity of the thermosetting resin forming the heat-resistant part (12) is low. Examples of the thermosetting resin forming the heat-resistant part (12) include epoxy resin, phenol resin, unsaturated polyester resin, varnish, foams of those resins, and the like.

The heat-resistant part (12) has at least one of a function of suppressing heat transmission between the casing (20) and the functional part (11) and a function of relaxing concentration of stress applied from the casing (20) to the functional part (11). Hereinafter, the function of suppressing heat transmission between the casing (20) and the functional part (11) is referred to as a "first protective function", and the function of relaxing concentration of stress applied from the casing (20) to the functional part (11) is referred to as a "second protective function".

First Protective Function

The first protective function is achieved with the heat-resistant part (12) having the following configuration.

The heat-resistant part (12) is configured to suppress transmission of heat, applied to the heat-resistant part (12) during a manufacturing process, from the heat-resistant part (12) to the functional part (11), to suppress reduction due to heat in holding force to hold the functional part (11) between the stator (60) and the heat-resistant part (12) and maintain a state in which the functional part (11) is held between the stator (60) and the heat-resistant part (12).

Such a configuration can protect the functional part (11) from the heat applied to the heat-resistant part (12) during the manufacturing process. Thus, the state in which the functional part (11) is held between the stator (60) and the heat-resistant part (12) can be maintained.

Examples of a cause of the reduction in the holding force as described above include deformation, melting, decomposition, and the like of the functional part (11) due to heat. For example, when the functional part (11) is deformed by heat, adhesion between the functional part (11) and the heat-resistant part (12) or adhesion between the functional part (11) and the stator (60) is decreased. As a result, the functional part (11) may fail to be held between the stator (60) and the heat-resistant part (12).

In this example, the stator (60), the functional part (11), and the heat-resistant part (12) are fastened by shrink-fitting the casing (20). The temperature of heat denaturing the functional part (11) is lower than the temperature of heat denaturing the heat-resistant part (12). The temperature of heat denaturing the functional part (11) is the temperature of heat causing deformation, melting, decomposition, or the like of the functional part (11). Examples of the temperature of heat causing deformation, melting, decomposition, or the like include a melting point, a decomposition temperature, or the like. In this example, the melting point or the decomposition temperature of the functional part (11) is lower than the melting point or the decomposition temperature of the heat-resistant part (12). The heat-resistant part (12) is configured to cause the temperature of the functional part (11) during shrink fitting to be equal to or lower than the melting point or the decomposition temperature of the functional part (11). The heat-resistant part (12) may be configured to cause the temperature of the surface in contact with the functional part (11) and the temperature of the functional part (11) to be lower than the temperature of the surface in contact with the casing (20) during shrink fitting. Furthermore, the heat-resistant part (12) may be configured to cause the temperature of the functional part (11) during shrink fitting to be lower than the shrink fitting temperature.

Such a configuration can protect the functional part (11) from the heat applied to the heat-resistant part (12) during the shrink fitting. Thus, the state in which the functional part (11) is held between the stator (60) and the heat-resistant part (12) can be maintained.

With the above configuration, the heat-resistant part (12) can have the first protective function. Thus, heat transmission between the casing (20) and the functional part (11) can be suppressed. For example, heat transmission between the casing (20) and the functional part (11) can be suppressed during the shrink fitting.

Second Protective Function

The second protective function is achieved with the heat-resistant part (12) having at least one of the following three configurations.

The surface of the heat-resistant part (12) in contact with the functional part (11) has smaller surface roughness than the surface roughness of the inner circumference surface of the casing (20).

The surface of the heat-resistant part (12) in contact with the functional part (11) has lower profile than the profile of the inner circumference surface of the casing (20).

The surface of the heat-resistant part (12) in contact with the functional part (11) has smaller surface hardness than the surface hardness of the inner circumference surface of the casing (20).

With the above configuration, the heat-resistant part (12) can have the second protective function. Thus, concentration of stress applied from the casing (20) to the functional part (11) can be relaxed. For example, concentration of stress applied from the casing (20) to the functional part (11) during the shrink fitting can be relaxed.

Method of Manufacturing Motor Apparatus

The motor apparatus (10) can be manufactured by the following three manufacturing methods.

First manufacturing method: the functional parts (11) and the heat-resistant parts (12) are fixed to the protruding sections (64) of the stator (60) by insert molding, and the casing (20) is shrink-fitted to the stator (60) to which the functional parts (11) and the heat-resistant parts (12) are fixed. Specifically, the diameter of the casing (20) is increased by heating, an assembly including the stator (60), the functional parts (11), and the heat-resistant parts (12) is disposed inside the casing (20) with the increased diameter, and the diameter of the casing (20) is decreased by cooling. As a result, the stator (60), the functional parts (11), and the heat-resistant parts (12) are fastened by the casing (20).

Second manufacturing method: the functional parts (11) and the heat-resistant parts (12) are prepared, the functional parts (11) and the heat-resistant parts (12) thus prepared are disposed on the protruding sections (64) of the stator (60), and the casing (20) is shrink-fitted to the stator (60) on which the functional parts (11) and the heat-resistant parts (12) are disposed.

Third manufacturing method: the functional parts (11) and the heat-resistant parts (12) are fixed to the protruding sections (64) of the stator (60) using an adhesive, and the casing (20) is shrink-fitted to the stator (60) to which functional parts (11) and the heat-resistant parts (12) are fixed.

Advantageous Effects of First Embodiment

As described above, in the motor apparatus (10) of the first embodiment, the heat-resistant part (12) is provided between the casing (20) and the functional part (11), whereby the functional part (11) can be protected from adverse effects caused by heat.

When the high-temperature casing (20) comes into direct contact with the functional part (11) during shrink fitting, the temperature of the functional part (11) may sharply rise and the functional part (11) may deteriorate. This is an example of the adverse effects caused by heat.

In the motor apparatus (10) of the first embodiment, the heat transmission between the casing (20) and the functional part (11) can be suppressed by the first protective function of the heat-resistant part (12), whereby the temperature rise of the functional part (11) during the shrink fitting can be suppressed. Thus, the deterioration of the functional part (11) due to a sharp temperature rise during the shrink fitting can be suppressed.

Furthermore, in the case where the casing (20) is in direct contact with the functional part (11) during the shrink fitting, as heat is released from the casing (20) and the diameter of the casing (20) decreases, stress applied from the casing (20) to the functional part (11) may be concentrated depending on a condition of a contact portion between the casing (20) and the functional part (11), resulting in deterioration of the functional part (11). This is an example of the adverse effects caused by heat.

In the motor apparatus (10) of the first embodiment, the concentration of stress applied from the casing (20) to the functional part (11) during the shrink fitting can be relaxed by the second protective function of the heat-resistant part (12). Thus, deterioration of the functional part (11) due to the concentration of stress can be suppressed.

First Modification of First Embodiment

A motor apparatus (10) of a first modification of the first embodiment is different from the motor apparatus (10) of the first embodiment in the shapes of the functional part (11) and the heat-resistant part (12). The other configurations of the motor apparatus (10) of the first modification of the first embodiment are the same as those of the motor apparatus (10) of the first embodiment.

Functional Part

Figure 3:
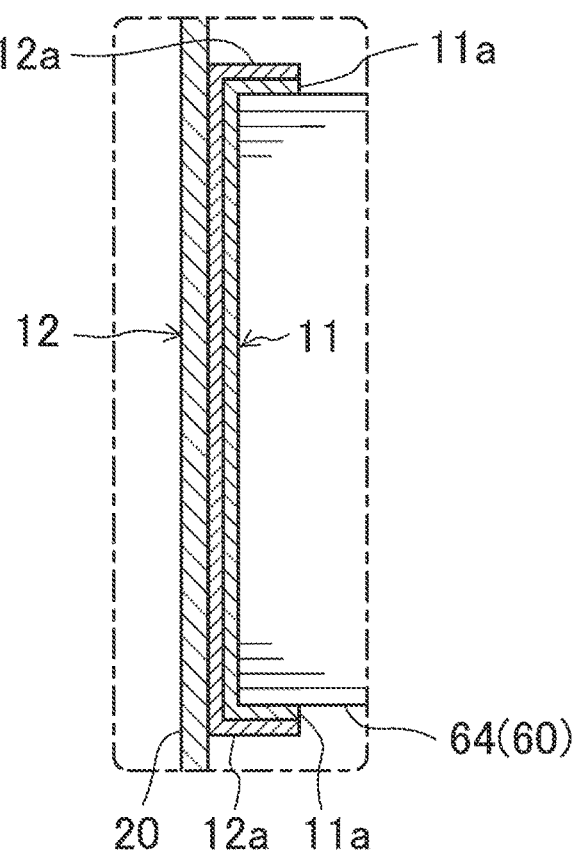
FIG. 3 is a longitudinal sectional view illustrating an example of a main part of a motor apparatus according to a first modification of the first embodiment.

As illustrated in FIG. 3, in the motor apparatus (10) of the first modification of the first embodiment, both end portions of the functional part (11) in the axial direction extend inward in the radial direction along both end portions of the protruding section (64) of the stator (60) in the axial direction. In the example illustrated in FIG. 3, the functional part (11) is formed to have a longitudinal section in a U-shape open inward in the radial direction. Both end portions (extension sections) of the functional part (11) in the axial direction sandwich the protruding section (64) in the axial direction.

In other words, the functional part (11) has two extension sections (11a). The two extension sections (11a) are provided at two respective end portions of the functional part (11) in the axial direction. Each of the two extension sections (11a) extends inward in the radial direction along an end surface of the protruding section (64) of the stator (60) in the axial direction. The two extension sections (11a) sandwich the protruding section (64) of the stator (60) in the axial direction.

Heat-Resistant Part

As illustrated in FIG. 3, in the motor apparatus (10) of the first modification of the first embodiment, both end portions of the heat-resistant part (12) in the axial direction extend inward in the radial direction along both end portions (extension sections) of the functional part (11) in the axial direction. In the example illustrated in FIG. 3, the heat-resistant part (12) is formed to have a longitudinal section in a U-shape open inward in the radial direction. Both end portions (extension sections) of the heat-resistant part (12) in the axial direction sandwich the functional part (11) in the axial direction.

In other words, the heat-resistant part (12) has two extension sections (12a). The two extension sections (12a) are provided at two respective end portions of the heat-resistant part (12) in the axial direction. Each of the two extension sections (12a) sandwiching, with the protruding section (64) of the stator (60), the corresponding extension section (11a)

of the functional part (11) extends inward in the radial direction along the end surface of the protruding section (64) of the stator (60) in the axial direction. The two extension sections (12a) sandwiching, with the protruding section (64) of the stator (60), the extension sections (11a) of the functional part (11) sandwich the protruding section (64) of the stator (60) in the axial direction.

The heat-resistant part (12) is configured to hinder movement of one of the first member and the second member with respect to the other thereof in the axial direction. In this example, the heat-resistant part (12) is configured to hinder movement of the stator (60) with respect to the casing (20) in the axial direction.

Specifically, the extension sections (12a) of the heat-resistant part (12) support the protruding section (64) of the stator (60) in the axial direction. Such a configuration hinders unintended movement of the stator (60) with respect to the casing (20) in the axial direction since the extension sections (11a) of the functional part (11) provided on the outer circumference of the stator (60) come into contact with the extension sections (12a) of the heat-resistant part (12) provided on the inner circumference of the casing (20).

The motor apparatus (10) of the first modification of the first embodiment can be manufactured by a fourth manufacturing method described below, in addition to the first to the third manufacturing methods described above.

Fourth manufacturing method: the functional part (11) and the heat-resistant part (12) formed to have a longitudinal section in a U-shape open inward in the radial direction are prepared, the protruding section (64) of the stator (60) is sandwiched in the axial direction between the functional part (11) and the heat-resistant part (12) thus prepared, and the casing (20) is shrink-fitted to the stator (60) the protruding section (64) of which is sandwiched between the functional part (11) and the heat-resistant part (12).

Advantageous Effects of First Modification of First Embodiment

As described above, in the motor apparatus (10) of the first modification of the first embodiment, both end portions of the functional part (11) in the axial direction extend inward in the radial direction along both end portions of the protruding section (64) of the stator (60) in the axial direction. Thus, a risk of peeling of the functional part (11) can be reduced.

In the first modification of the first embodiment, both end portions of the heat-resistant part (12) in the axial direction extend inward in the radial direction along both end portions of the functional part (11) in the axial direction. Thus, a risk of peeling of the heat-resistant part (12) can be reduced.

According to the first modification of the first embodiment, movement of the stator (60) with respect to the casing (20) in the axial direction can be hindered. Thus, accidental movement of the stator (60) with respect to the casing (20) in the axial direction can be prevented. Thus, for example, the stator (60) can be prevented from falling off.

While an example of a case where the heat-resistant part (12) includes two extension sections (12a) is described above, this should not be construed in a limiting sense. For example, the heat-resistant part (12) may have only one of the two extension sections (12a).

In a configuration in which larger force acts on the stator (60) in a direction from one end to the other end in the axial direction than in a direction from the other end to the one end in the axial direction, in other words, in a configuration in which force to move the stator (60) from the one end to the other end in the axial direction acts on the stator (60), the heat-resistant part (12) may have the extension section (12a) extending inward in the radial direction only on the other end side of the stator (60) in the axial direction. For example, when the axial direction is along the vertical direction, in other words, when the shaft (50) extends in the up-down direction, the heat-resistant part (12) may have the extension section (12a) extending inward in the radial direction only on the lower side of the stator (60) in the vertical direction.

Second Modification of First Embodiment

A motor apparatus (10) of a second modification of the first embodiment is different from the motor apparatus (10) of the first embodiment in the shapes of the functional part (11) and the heat-resistant part (12). The other configurations of the motor apparatus (10) of the second modification of the first embodiment are the same as those of the motor apparatus (10) of the first embodiment.

Figure 4:
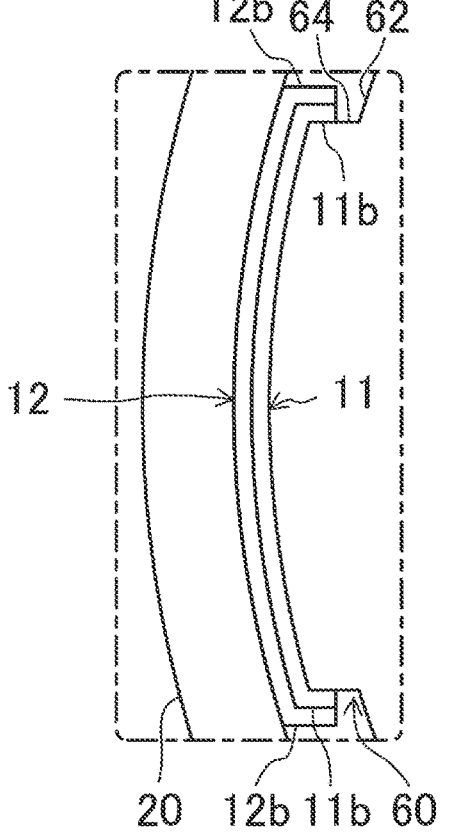
FIG. 4 is a transverse sectional view illustrating an example of a main part of a motor apparatus according to a second modification of the first embodiment.

As illustrated in FIG. 4, in the motor apparatus (10) of the second modification of the first embodiment, both end portions of the functional part (11) in the circumferential direction extend inward in the radial direction along both end portions (extension sections) of the protruding section (64) of the stator (60) in the circumferential direction. In the example illustrated in FIG. 4, the functional part (11) is formed to have a transverse section in a U-shape open inward in the radial direction. Both end portions (extension sections) of the functional part (11) in the circumferential direction sandwich the protruding section (64) in the circumferential direction.

In other words, the functional part (11) has two extension sections (11b). The two extension sections (11b) are provided at two respective end portions of the functional part (11) in the circumferential direction. Each of the two extension sections (11b) extends inward in the radial direction along an end surface of the protruding section (64) of the stator (60) in the circumferential direction. The two extension sections (11b) sandwich the protruding section (64) of the stator (60) in the circumferential direction.

As illustrated in FIG. 4, in the motor apparatus (10) of the second modification of the first embodiment, both end portions of the heat-resistant part (12) in the circumferential direction extend inward in the radial direction along both end portions of the functional part (11) in the circumferential direction. In the example illustrated in FIG. 4, the heat-resistant part (12) is formed to have a transverse section in a U-shape open inward in the radial direction. Both end portions (extension sections) of the heat-resistant part (12) in the circumferential direction sandwich the functional part (11) in the circumferential direction.

In other words, the heat-resistant part (12) has two extension sections (12b). The two extension sections (12b) are provided at two respective end portions of the heat-resistant part (12) in the circumferential direction. Each of the two extension sections (12b) sandwiching, with the protruding section (64) of the stator (60), the extension section (11b) of the functional part (11) extends inward in the radial direction along the end surface of the protruding section (64) of the stator (60) in the circumferential direction. The two extension sections (12b) sandwiching, with the protruding section (64) of the stator (60), the extension section (11b) of the functional part (11) sandwich the protruding section (64) of the stator (60) in the circumferential direction.

The heat-resistant part (12) is configured to hinder rotation of one of the first member and the second member with respect to the other thereof. In this example, the heat-resistant part (12) is configured to hinder rotation of the stator (60) with respect to the casing (20).

Specifically, the extension sections (12b) of the heat-resistant part (12) support the protruding section (64) of the stator (60) in the circumferential direction. Such a configuration hinders unintended rotation of the stator (60) with respect to the casing (20) since the extension sections (11b) of the functional part (11) provided on the outer circumference of the stator (60) come into contact with the extension sections (12b) of the heat-resistant part (12) provided on the inner circumference of the casing (20).

The motor apparatus (10) of the second modification of the first embodiment can be manufactured by a fifth manufacturing method described below, in addition to the first to the third manufacturing methods described above.

Fifth manufacturing method: the functional part (11) and the heat-resistant part (12) formed to have a transverse section in a U-shape open inward in the radial direction are prepared, the protruding section (64) of the stator (60) is sandwiched between the functional part (11) and the heat-resistant part (12) thus prepared in the circumferential direction, and the casing (20) is shrink-fitted to the stator (60) the protruding section (64) of which is sandwiched between the functional part (11) and the heat-resistant part (12).

Advantageous Effects of Second Modification of First Embodiment

As described above, in the motor apparatus (10) of the second modification of the first embodiment, both end portions of the functional part (11) in the circumferential direction extend inward in the radial direction along both end portions of the protruding section (64) of the stator (60) in the circumferential direction. Thus, a risk of peeling of the functional part (11) can be reduced.

In the second modification of the first embodiment, both end portions of the heat-resistant part (12) in the circumferential direction extend inward in the radial direction along both end portions of the functional part (11) in the circumferential direction. Thus, a risk of peeling of the heat-resistant part (12) can be reduced.

According to the second modification of the first embodiment, rotation of the stator (60) with respect to the casing (20) can be hindered. Thus, accidental rotation of the stator (60) with respect to the casing (20) can be prevented. Thus, for example, the stator (60) can be prevented from rotating.

While an example of a case where the heat-resistant part (12) includes two extension sections (12b) is described above, this should not be construed in a limiting sense. For example, the heat-resistant part (12) may have only one of the two extension sections (12b).

In a configuration in which larger force acts on the stator (60) in one circumferential direction than in the other circumferential direction, the heat-resistant part (12) may have the extension section (12a) extending inward in the radial direction only along an end portion of the extension section (11b) of the functional part (11) on the downstream side in the one circumferential direction. For example, when the rotor (70) is configured to rotate only in one direction, the heat-resistant part (12) may have the extension section (12a) extending inward in the radial direction only along an end portion on the upstream side in the rotational direction of the rotor (70), out of the end portions of the extension sections (11b) of the functional part (11).

Third Modification of First Embodiment

A motor apparatus (10) of a third modification of the first embodiment is different from the motor apparatus (10) of the first modification of the first embodiment in the shape of the heat-resistant part (12). The other configurations of the motor apparatus (10) of the third modification of the first embodiment are the same as those of the motor apparatus (10) of the first modification of the first embodiment.

Figure 5:
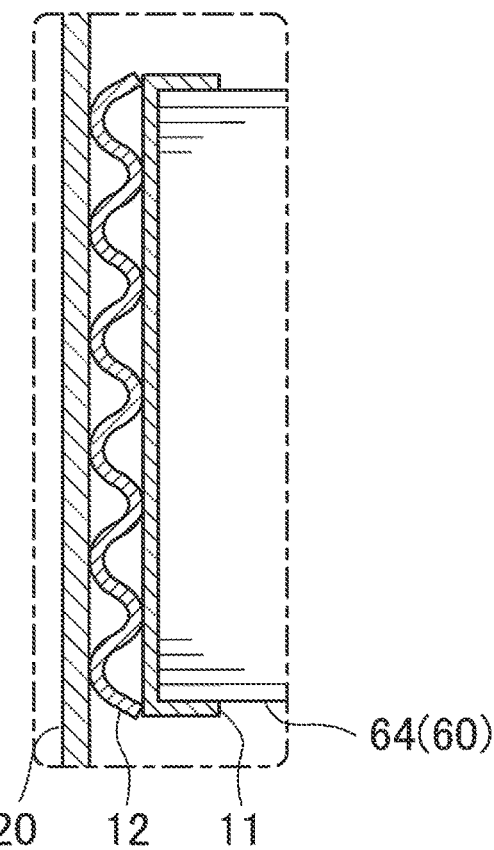
FIG. 5 is a longitudinal sectional view illustrating an example of a main part of a motor apparatus according to a third modification of the first embodiment.

As illustrated in FIG. 5, in the motor apparatus (10) of the third modification of the first embodiment, the heat-resistant part (12) has a longitudinal section in a corrugated shape. In the example illustrated in FIG. 5, the heat-resistant part (12) is a plate-like member, and is formed in a corrugated shape in the axial direction. The heat-resistant part (12) has elasticity.

Advantageous Effects of Third Modification of First Embodiment

As described above, in the motor apparatus (10) of the third modification of the first embodiment, the heat transmission between the casing (20) and the functional part (11) can be further suppressed with the heat-resistant part (12) formed to have the longitudinal section in a corrugated shape, than in a case where the heat-resistant part (12) is in close contact with the casing (20) and the functional part (11).

According to the third modification of the first embodiment, the heat-resistant part (12) has elasticity, and thus an elastic support structure can be formed by the heat-resistant part (12). Thus, transmission of vibration between the stator (60) and the casing (20) can be suppressed.

Note that the heat-resistant part (12) does not necessarily have elasticity.

Fourth Modification of First Embodiment

A motor apparatus (10) of a fourth modification of the first embodiment is different from the motor apparatus (10) of the second modification of the first embodiment in the shape of the heat-resistant part (12). The other configurations of the motor apparatus (10) of the fourth modification of the first embodiment are the same as those of the motor apparatus (10) of the second modification of the first embodiment.

Figure 6:
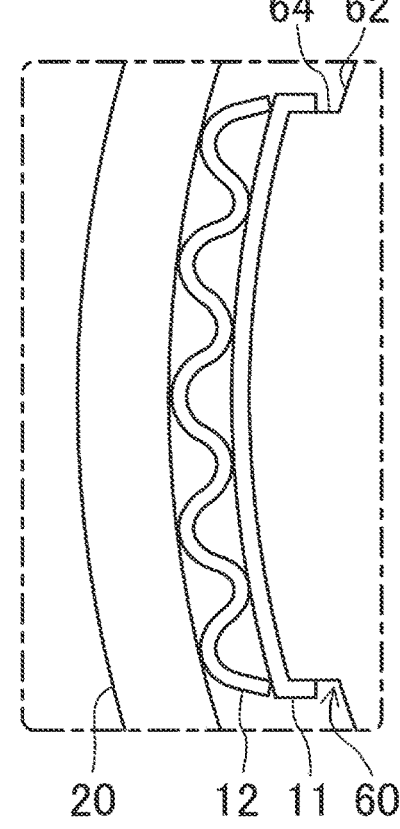
FIG. 6 is a transverse sectional view illustrating an example of a main part of a motor apparatus according to a fourth modification of the first embodiment.

As illustrated in FIG. 6, in the motor apparatus (10) of the fourth modification of the first embodiment, the heat-resistant part (12) has a transverse section in a corrugated shape. In the example illustrated in FIG. 6, the heat-resistant part (12) is a plate-like member, and is formed in a corrugated shape in the circumferential direction. The heat-resistant part (12) has elasticity.

Advantageous Effects of Fourth Modification of First Embodiment

As described above, in the motor apparatus (10) of the fourth modification of the first embodiment, the heat transmission between the casing (20) and the functional part (11) can be further suppressed with the heat-resistant part (12) formed to have the transverse section in a corrugated shape, than in a case where the heat-resistant part (12) is in close contact with the casing (20) and the functional part (11).

According to the fourth modification of the first embodiment, the heat-resistant part (12) has elasticity, and thus an elastic support structure can be formed by the heat-resistant part (12). Thus, transmission of vibration between the stator (60) and the casing (20) can be suppressed.

Note that the heat-resistant part (12) does not necessarily have elasticity.

Fifth Modification of First Embodiment

A motor apparatus (10) of a fifth modification of the first embodiment is different from the motor apparatus (10) of the first modification of the first embodiment in the shape of the heat-resistant part (12). The other configurations of the motor apparatus (10) of the fifth modification of the first embodiment are the same as those of the motor apparatus (10) of the first modification of the first embodiment.

Figure 7:
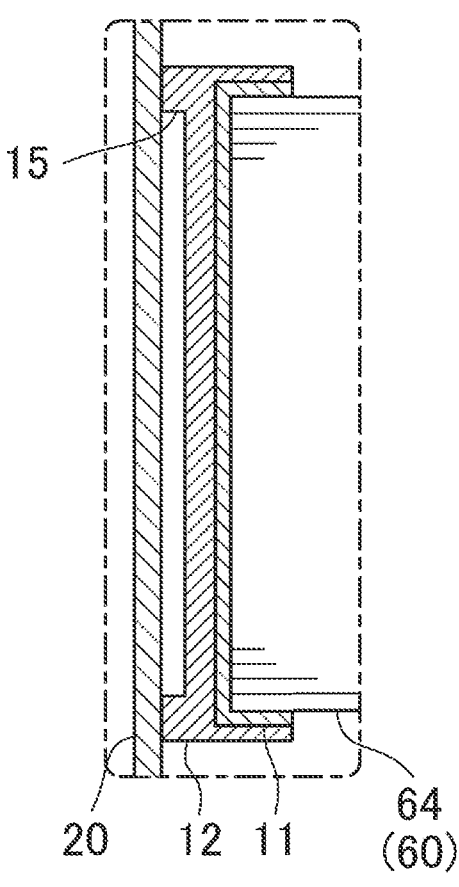
FIG. 7 is a longitudinal sectional view illustrating an example of a main part of a motor apparatus according to a fifth modification of the first embodiment.

As illustrated in FIG. 7, in the motor apparatus (10) of the fifth modification of the first embodiment, a space 15 (air layer) is formed between the casing (20) and the heat-resistant part (12).

Advantageous Effects of Fifth Modification of First Embodiment

As described above, in the motor apparatus (10) of the fifth modification of the first embodiment, the heat transmission between the casing (20) and the functional part (11) can be further suppressed with the space 15 (air layer) formed between the casing (20) and the heat-resistant part (12), than in a case where the heat-resistant part (12) is in close contact with the casing (20).

In the motor apparatus (10) of the second modification of the first embodiment, the space 15 (air layer) may be formed between the casing (20) and the heat-resistant part (12).

Sixth Modification of First Embodiment

A motor apparatus (10) of a sixth modification of the first embodiment is different from the motor apparatus (10) of the first embodiment in the manufacturing method. The other configurations of the motor apparatus (10) of the sixth modification of the first embodiment are the same as those of the motor apparatus (10) of the first embodiment.

In the motor apparatus (10) of the sixth modification of the first embodiment, the heat-resistant part (12) is joined to the casing (20) by welding, in a state in which the stator (60) and the functional part (11) are in close contact with each other and the functional part (11) and the heat-resistant part (12) are in close contact with each other.

In the motor apparatus (10) of the sixth modification of the first embodiment, the heat-resistant part (12) is configured to suppress transmission of heat, applied to the heat-resistant part (12) during welding, from the heat-resistant part (12) to the functional part (11), to suppress reduction due to heat in holding force to hold the functional part (11) between the stator (60) and the heat-resistant part (12) and maintain a state in which the functional part (11) is held between the stator (60) and the heat-resistant part (12).

Advantageous Effects of Sixth Modification of First Embodiment

As described above, in the motor apparatus (10) of the sixth modification of the first embodiment, transmission of heat, applied to the heat-resistant part (12) during welding, from the heat-resistant part (12) to the functional part (11) can be suppressed, and thus the functional part (11) can be protected from the heat applied to the heat-resistant part (12) during welding. Thus, the state in which the functional part (11) is held between the stator (60) and the heat-resistant part (12) can be maintained.

Second Embodiment

Figure 8:
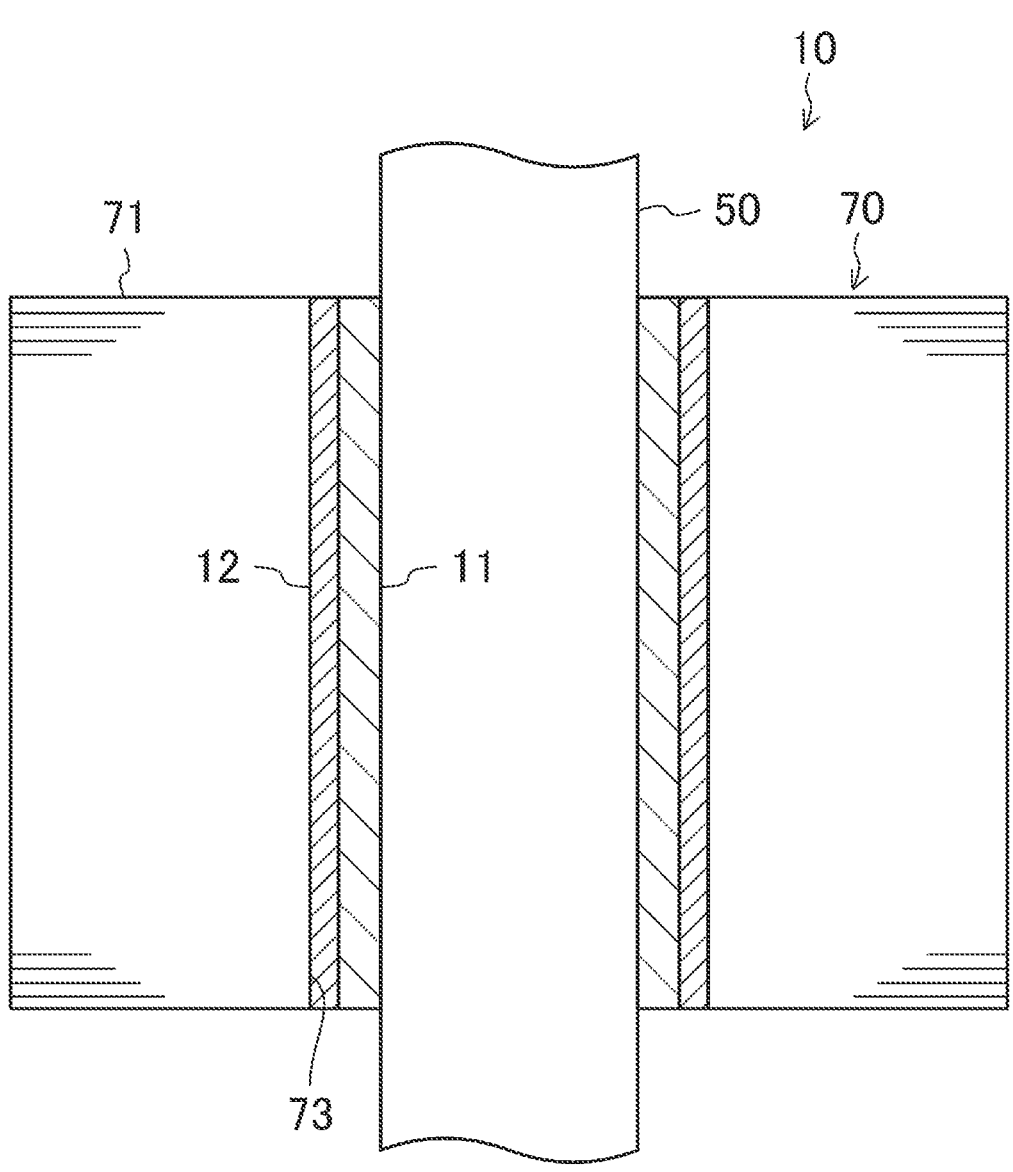
FIG. 8 is a longitudinal sectional view illustrating an example of a main part of a motor apparatus according to a second embodiment.
Figure 9:
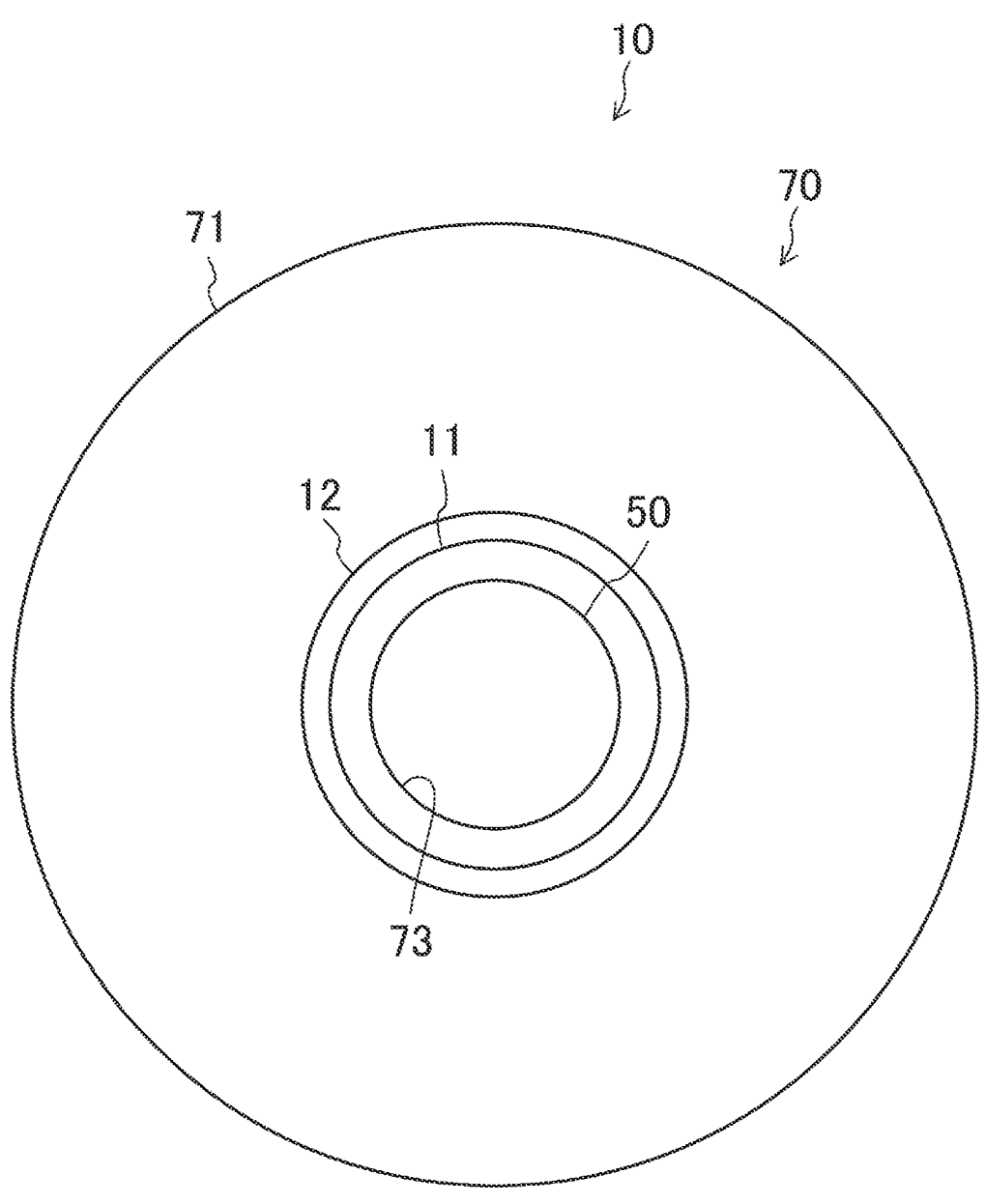
FIG. 9 is a transverse sectional view illustrating an example of the main part of the motor apparatus according to the second embodiment.

FIG. 8 and FIG. 9 illustrate an example of a configuration of a motor apparatus (10) according to a second embodiment. The motor apparatus (10) of the second embodiment is different from the motor apparatus (10) of the first embodiment in the functional part (11) and the heat-resistant part (12). The other configurations of the motor apparatus (10) of the second embodiment are the same as those of the motor apparatus (10) of the first embodiment.

Functional Part

In the second embodiment, the functional part (11) is provided on the outer circumference of the shaft (50). The functional part (11) is in contact with the shaft (50). The shaft (50) is an example of the first member.

In this example, the functional part (11) is formed in a cylindrical shape, and covers a facing surface that is a portion of the outer circumference surface of the shaft (50) and that faces the inner circumference surface of the rotor (70) in the radial direction. Specifically, the functional part (11) extends along the facing surface of the shaft (50) in the axial direction. The functional part (11) also extends along the facing surface of the shaft (50) in the circumferential direction. The transverse section of the functional part (11) has an annular shape.

The functional part (11) may be larger or smaller than the facing surface of the shaft (50). For example, the functional part (11) may have a surface area (area of a portion in contact with the facing surface of the shaft (50)) that is larger or smaller than the area of the facing surface of the shaft (50).

The functional part (11) has at least one of a function of insulating the shaft (50) and the rotor (70) from each other, and a function of suppressing transmission of vibration between the shaft (50) and the rotor (70). Such a configuration can achieve at least one of the insulation between the shaft (50) and the rotor (70) and the suppression of transmission of vibration between the shaft (50) and the rotor (70).

Heat-Resistant Part

In the second embodiment, the heat-resistant part (12) is provided between the rotor (70) and the functional part (11). The heat-resistant part (12) is in contact with both the rotor (70) and the functional part (11). The heat-resistant part (12) prevents contact between the rotor (70) and the functional part (11). The rotor (70) is an example of the second member. The combination of the shaft (50) and the rotor (70) is an example of a combination of the first member and the second member.

In this example, the heat-resistant part (12) is formed in a cylindrical shape and covers the outer circumference surface of the functional part (11). Specifically, the heat-resistant part (12) extends in the axial direction along the outer circumference surface of the functional part (11). The heat-resistant part (12) extends in the circumferential direction along the outer circumference surface of the functional part (11). The transverse section of the heat-resistant part (12) has an annular shape.

Note that the heat-resistant part (12) may be larger or smaller than the functional part (11). For example, the heat-resistant part (12) may have a surface area (area of a portion in contact with the functional part (11)) that is larger or smaller than the surface area of the functional part (11). The heat-resistant part (12) may be larger or smaller than the inner circumference surface of the rotor (70).

In this example, the shaft (50), the functional part (11), and the heat-resistant part (12) are fastened by shrink-fitting the rotor (70). The temperature of heat denaturing the heat-resistant part (12) is higher than the temperature for shrink fitting. Specifically, the melting point or the decomposition temperature of the heat-resistant part (12) is higher than the shrink fitting temperature. Such a configuration can suppress deterioration of the heat-resistant part (12) due to heat applied during the shrink fitting.

In the second embodiment, the heat-resistant part (12) has at least one of a function of insulating the shaft (50) and the rotor (70) from each other, and a function of suppressing transmission of vibration between the shaft (50) and the rotor (70). Hereinafter, the function of suppressing heat transmission between the rotor (70) and the functional part (11) is referred to as a "first protective function", and the function of relaxing concentration of stress applied from the rotor (70) to the functional part (11) is referred to as a "second protective function".

A configuration for achieving the first protective function in the second embodiment is the same as the configuration for achieving the first protective function in the first embodiment. Specifically, the configuration for achieving the first protective function in the second embodiment corresponds to a configuration obtained by replacing the "stator (60)" with the "shaft (50)" and replacing the "casing (20)" with the "rotor (70)" in the configuration for achieving the first protective function in the first embodiment.

Advantageous Effects of Second Embodiment

As described above, in the motor apparatus (10) of the second embodiment, the heat-resistant part (12) is provided between the rotor (70) and the functional part (11), whereby the functional part (11) can be protected from adverse effects caused by heat.

The motor apparatus (10) of the second embodiment can provide the same effects as the motor apparatus (10) of the first embodiment does.

First Modification of Second Embodiment

Figure 10:
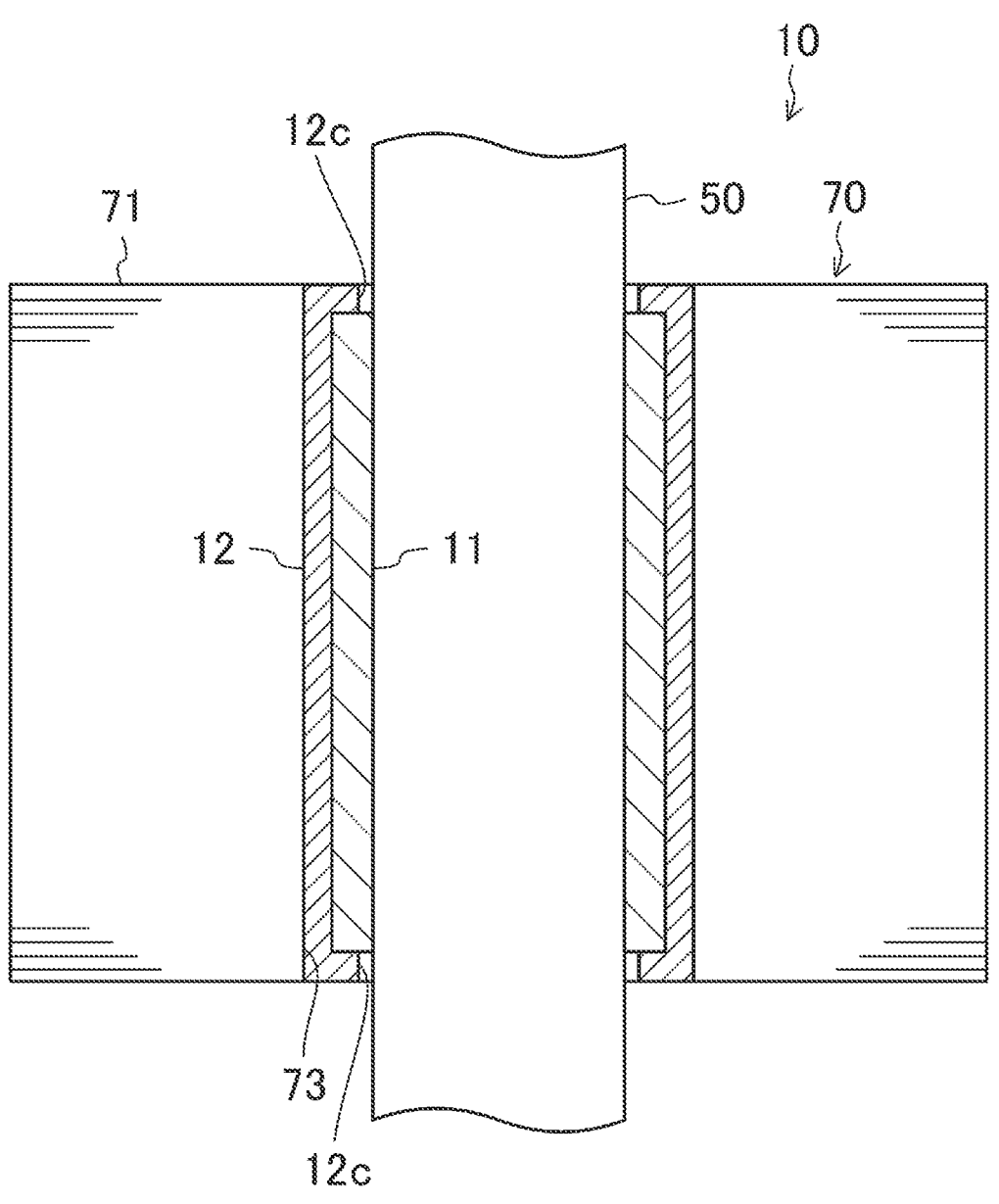
FIG. 10 is a longitudinal sectional view illustrating an example of a main part of a motor apparatus according to a first modification of the second embodiment.

A motor apparatus (10) of a first modification of the second embodiment is different from the motor apparatus (10) of the second embodiment in the shapes of the functional part (11) and the heat-resistant part (12). The other configurations of the motor apparatus (10) of the first modification of the second embodiment are the same as those of the motor apparatus (10) of the second embodiment.
Functional Part As illustrated in FIG. 10, in the motor apparatus (10) of the first modification of the second embodiment, the length of the functional part (11) in the axial direction is shorter than the length of the facing surface (portion of the outer circumference surface of the shaft (50) facing the inner circumference surface of the rotor (70) in the radial direction) of the shaft (50) in the axial direction.
Heat-Resistant Part As illustrated in FIG. 10, in the motor apparatus (10) of the first modification of the second embodiment, both end portions of the heat-resistant part (12) in the axial direction extend inward in the radial direction along both end portions of the functional part (11) in the axial direction to sandwich the functional part (11) in the axial direction.

In other words, the heat-resistant part (12) has two extension sections (12c). The two extension sections (12c) are provided at two respective end portions of the heat-resistant part (12) in the axial direction. Each of the two extension sections (12c) is formed in an annular shape, and extends inward in the radial direction along an end surface of the functional part (11) in the axial direction. The two extension sections (12c) sandwich the functional part (11) in the axial direction.

In this example, the heat-resistant part (12) is configured to hinder movement of the rotor (70) with respect to the shaft (50) in the axial direction. Specifically, the extension sections (12c) of the heat-resistant part (12) sandwich the functional part (11) in the axial direction. Such a configuration hinders unintended movement of the rotor (70) with respect to the shaft (50) in the axial direction since the extension sections (12c) of the heat-resistant part (12) provided on the inner circumference of the rotor (70) come into contact with the functional part (11) provided on the outer circumference of the shaft (50).

Advantageous Effects of First Modification of Second Embodiment

As described above, in the motor apparatus (10) of the first modification of the second embodiment, movement of the rotor (70) with respect to the shaft (50) in the axial direction can be hindered. Thus, accidental movement of the rotor (70) with respect to the shaft (50) in the axial direction can be prevented. Thus, for example, the rotor (70) can be prevented from falling off.

While an example of a case where the extension sections (12c) of the heat-resistant part (12) extend inward in the radial direction is described, this should not be construed in a limiting sense. For example, the extension sections (12c) of the heat-resistant part (12) may extend outward in the radial direction along the end surfaces of the rotor (70) in the axial direction. In this case, recessed portions into which the extension sections (12c) of the heat-resistant part (12) are fitted may be provided at the center portion of the end surfaces of the rotor (70) in the axial direction.

While an example of a case where the heat-resistant part (12) includes two extension sections (12c) is described above, this should not be construed in a limiting sense. For example, the heat-resistant part (12) may have only one of the two extension sections (12c).

In a configuration in which larger force acts on the rotor (70) in a direction from one end to the other end in the axial direction than in a direction from the other end to the one end in the axial direction, in other words, in a configuration in which force to move the rotor (70) from the one end to the other end in the axial direction acts on the rotor (70), the heat-resistant part (12) may have an extension section (12c) extending inward in the radial direction only on the other end side of the rotor (70) in the axial direction. For example, when the axial direction is along the vertical direction, in other words, when the shaft (50) extends in the up-down direction, the heat-resistant part (12) may have the extension section (12c) extending inward in the radial direction only on the lower side of the rotor (70) in the vertical direction.

While an example of a case where the extension sections (12c) of the heat-resistant part (12) extend inward in the radial direction and a case where the extension sections (12c) extend outward in the radial direction are described, this should not be construed in a limiting sense. For example, the extension sections (12c) of the heat-resistant part (12) may include two extension sections (12c) extending inward in the radial direction and two extension sections (12c) extending outward in the radial direction.

The extension sections (12c) of the heat-resistant part (12) may include one extension section (12c) extending inward in the radial direction and one extension section (12c) extending outward in the radial direction. In this case, the one extension section (12c) extending inward in the radial direction may be provided at an end portion in the axial direction different from an end portion in the axial direction provided with the one extension section (12c) extending outward in the radial direction.

In a configuration in which larger force acts on the rotor (70) in a direction from one end to the other end in the axial direction than in a direction from the other end to the one end in the axial direction, in other words, in a configuration in which force to move the rotor (70) from the one end to the other end in the axial direction acts on the rotor (70), the one extension section (12c) extending inward in the radial direction may be provided on the other end side in the axial direction, and the one extension section (12c) extending outward in the radial direction may be provided on the one end side in the axial direction. For example, when the axial direction is along the vertical direction, in other words, when the shaft (50) extends in the up-down direction, the one extension section (12c) extending inward in the radial direction may be provided on the lower side in the vertical direction, and the one extension section (12c) extending outward in the radial direction may be provided on the upper side in the vertical direction.

Second Modification of Second Embodiment

Figure 11:
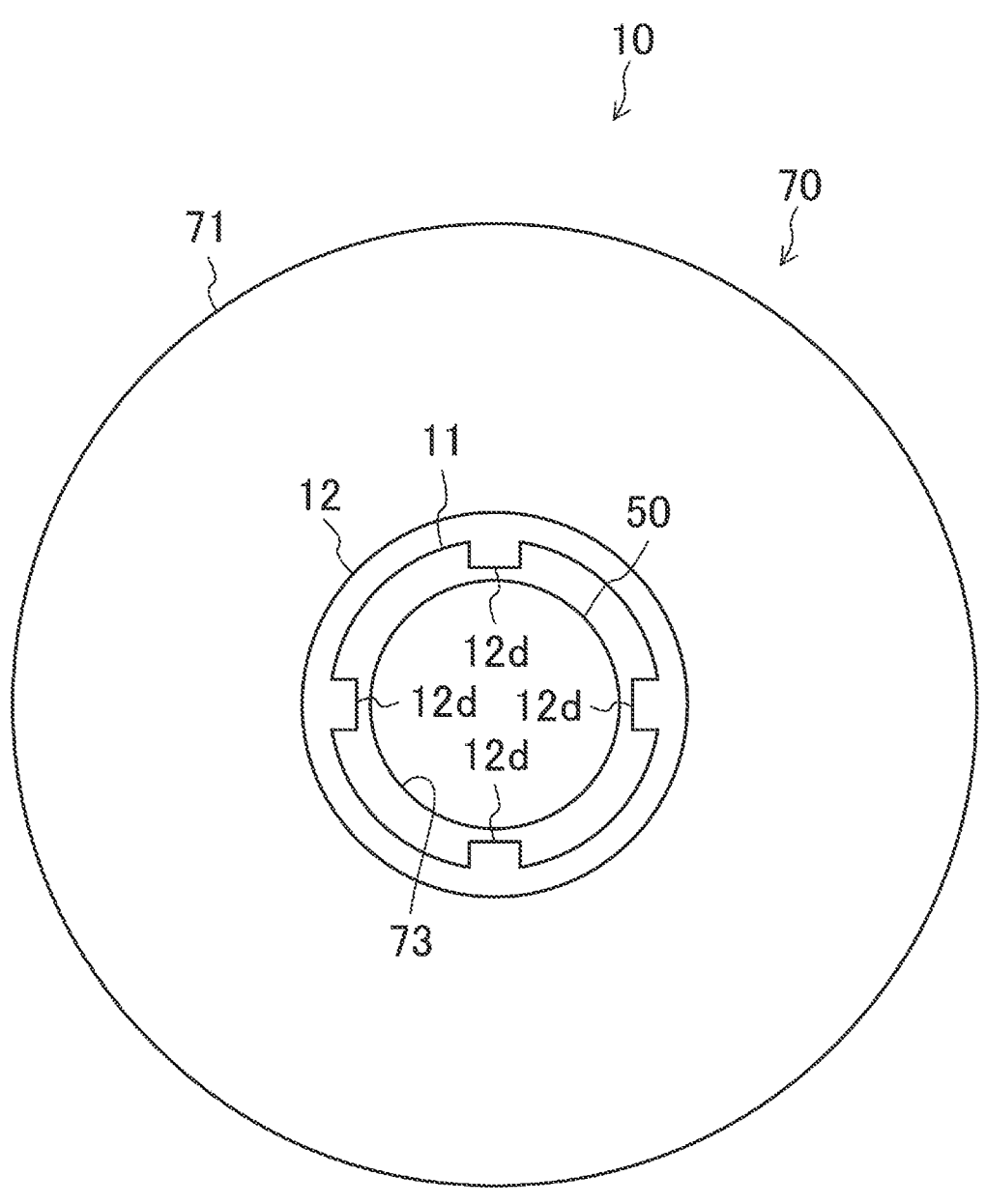
FIG. 11 is a transverse sectional view illustrating an example of a main part of a motor apparatus according to a second modification of the second embodiment.

A motor apparatus (10) of a second modification of the second embodiment is different from the motor apparatus (10) of the second embodiment in the shape of the heat-resistant part (12). The other configurations of the motor apparatus (10) of the second modification of the second embodiment are the same as those of the motor apparatus (10) of the second embodiment.
Heat-Resistant Part As illustrated in FIG. 11, the heat-resistant part (12) is provided with a plurality of protruding sections (12d). Each of the plurality of protruding sections (12d) protrudes inward from the heat-resistant part (12) in the radial direction and bites into the functional part (11). In this example, the heat-resistant part (12) is provided with four protruding sections (12d) arranged at an equal interval in the circumferential direction.

In this example, the heat-resistant part (12) is configured to hinder rotation of the rotor (70) with respect to the shaft (50). Specifically, the protruding sections (12d) of the heat-resistant part (12) protrude inward in the radial direction and bite into the functional part (11). Such a configuration hinders unintended rotation of the rotor (70) with respect to the shaft (50) since the protruding sections (12d) of the heat-resistant part (12) provided on the inner circumference of the rotor (70) come into contact with the functional part (11) provided on the outer circumference of the shaft (50).

Advantageous Effects of Second Modification of Second Embodiment

As described above, in the motor apparatus (10) of the second modification of the second embodiment, rotation of the rotor (70) with respect to the shaft (50) can be hindered. Thus, accidental rotation of the rotor (70) with respect to the shaft (50) can be prevented. Thus, for example, the rotor (70) can be prevented from rotating.

While an example of a case where the heat-resistant part (12) includes the four protruding sections (12d) is described above, this should not be construed in a limiting sense. For example, the heat-resistant part (12) may include one, two, or three protruding sections (12d), or may include five or more protruding sections (12d).

While an example of a case where the protruding sections (12d) of the heat-resistant part (12) extend inward in the radial direction is described, this should not be construed in a limiting sense. For example, the protruding sections (12d) of the heat-resistant part (12) may extend outward in the radial direction and bite into the rotor (70). In this case, recessed portions into which the protruding sections (12d) of the heat-resistant part (12) are fitted may be provided on the inner circumference surface of the rotor (70).

Third Modification of Second Embodiment

A motor apparatus (10) of a third modification of the second embodiment is different from the motor apparatus (10) of the second embodiment in the manufacturing method. The other configurations of the motor apparatus (10) of the third modification of the second embodiment are the same as those of the motor apparatus (10) of the second embodiment.

In the motor apparatus (10) of the third modification of the second embodiment, the heat-resistant part (12) is joined to the rotor (70) by welding, in a state in which the shaft (50) and the functional part (11) are in close contact with each other and the functional part (11) and the heat-resistant part (12) are in close contact with each other.

In the motor apparatus (10) of the third modification of the second embodiment, the heat-resistant part (12) is configured to suppress transmission of heat, applied to the heat-resistant part (12) during welding, from the heat-resistant part (12) to the functional part (11), to suppress reduction due to heat in holding force to hold the functional part (11) between the shaft (50) and the heat-resistant part (12) and maintain a state in which the functional part (11) is held between the shaft (50) and the heat-resistant part (12).

Advantageous Effects of Third Modification of Second Embodiment

Figure 12:
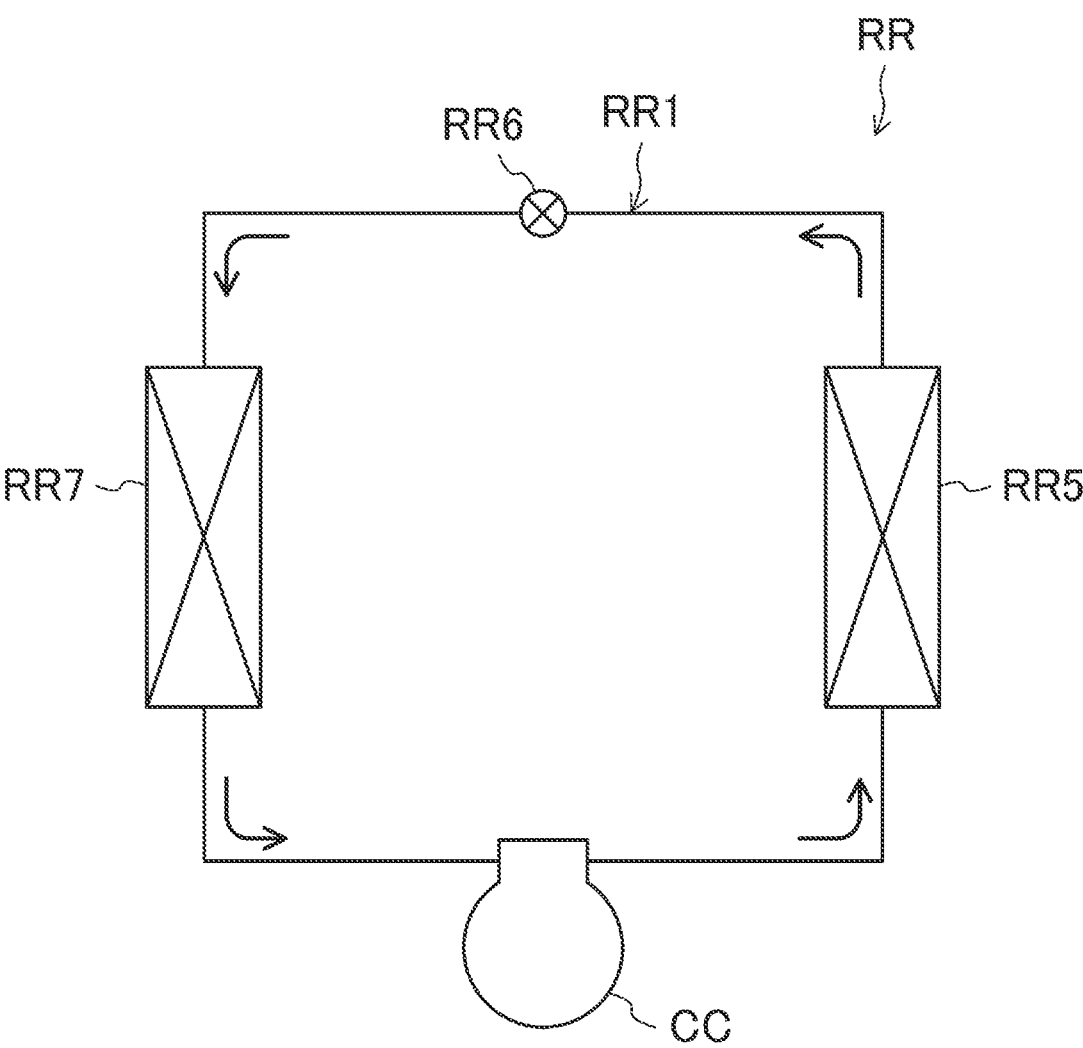
FIG. 12 is a diagram of an example of a configuration of a refrigeration apparatus.

As described above, in the motor apparatus (10) of the third modification of the second embodiment, transmission of heat, applied to the heat-resistant part (12) during welding, from the heat-resistant part (12) to the functional part (11) can be suppressed, and thus the functional part (11) can be protected from the heat applied to the heat-resistant part (12) during welding. Thus, the state in which the functional part (11) is held between the shaft (50) and the heat-resistant part (12) can be maintained.
Refrigeration Apparatus FIG. 12 is a diagram of an example of a configuration of a refrigeration apparatus (RR) including a compressor (CC) including the motor apparatus (10). The refrigeration apparatus (RR) includes a refrigerant circuit (RR1) filled with a refrigerant. The refrigerant circuit (RR1) includes the compressor (CC), a radiator (RR5), a decompression mechanism (RR6), and an evaporator (RR7). In this example, the decompression mechanism (RR6) is an expansion valve. The refrigerant circuit (RR1) implements a vapor compression refrigeration cycle.

In the refrigeration cycle, the refrigerant discharged from the compressor (CC) radiates heat in the radiator (RR5). The refrigerant flowing out from the radiator (RR5) is decompressed in the decompression mechanism (RR6) and evaporates in the evaporator (RR7). The refrigerant flowing out from the evaporator (RR7) is sucked into the compressor (CC).

In this example, the refrigeration apparatus (RR) is an air conditioner. The air conditioner may be a machine dedicated for cooling or a machine dedicated for heating. Furthermore, the air conditioner may be an air conditioner that switches between cooling and heating. In this case, the air conditioner has a switching mechanism (for example, a four-way switching valve) for switching a direction in which the refrigerant circulates. The refrigeration apparatus (RR) may be a water heater, a chiller unit, a cooling apparatus that cools air in a refrigerator, or the like. The cooling apparatus cools air inside a refrigerator, a freezer, a container, or the like.

Other Embodiments

While an example of a case where the stator (60) includes the protruding sections (64) is described above, this should not be construed in a limiting sense. The stator (60) does not necessarily include the protruding sections (64). For example, the outer circumference surface of the stator (60) may be a cylindrical surface. The functional part (11) and the heat-resistant part (12) may be formed over the entire outer circumference of the stator (60).

While embodiments and modifications have been described above, it should be understood that various changes in mode and detail may be made without departing from the spirit and scope of the claims. Combination and replacement between the embodiments and the modifications described above may be made as appropriate, as long as the target function of the present disclosure is not compromised.

As described above, the present disclosure is useful as a motor apparatus.

The invention claimed is:

1. A motor apparatus comprising:
a casing;
a stator disposed in the casing, the stator including a protruding section protruding radially outward from an outer circumference of the stator, the protruding section including a radially outward-facing surface and a circumferentially facing surface;
a rotor disposed on an inner circumference of the stator;
a shaft disposed on an inner circumference of the rotor;
a functional part disposed on the outer circumference of the stator; and
a heat-resistant part disposed between the functional part and the casing, wherein
the functional part includes an extension section that extends inward in a radial direction along the circumferentially facing surface of the protruding section,
the heat-resistant part includes an extension section that extends inward in the radial direction along the circumferentially facing surface of the protruding section such that the extension section of the functional part is sandwiched between the stator and the extension section of the heat-resistant part.

2. The motor apparatus according to claim 1, wherein the functional part at least one of
insulates the stator and the casing from each other and
suppresses transmission of vibration between the stator and the casing.

3. The motor apparatus according to claim 1, wherein the stator, the functional part, and the heat-resistant part are fastened by shrink-fitting the casing, and
a melting point or a decomposition temperature of the heat-resistant part is higher than a temperature during shrink fitting.

4. The motor apparatus according to claim 1, wherein the heat-resistant part suppresses heat transmission between the casing and the functional part.

5. The motor apparatus according to claim 4, wherein the heat-resistant part is configured to
suppress transmission of heat, applied to the heat-resistant part during a manufacturing process, from the heat-resistant part to the functional part,
suppress reduction due to the heat in holding force to hold the functional part between the stator and the heat-resistant part, and
maintain a state in which the functional part is held between the stator and the heat-resistant part.

6. The motor apparatus according to claim 5, wherein the stator, the functional part, and the heat-resistant part are fastened by shrink-fitting the casing,
a melting point or a decomposition temperature of the functional part is lower than a melting point or a decomposition temperature of the heat-resistant part, and
the heat-resistant part is configured to cause a temperature of the functional part during shrink fitting to be equal to or lower than the melting point or the decomposition temperature of the functional part.

7. The motor apparatus according to claim 5, wherein the heat-resistant part is joined to the casing by welding in a state in which the stator and the functional part are in close contact with each other and the functional part and the heat-resistant part are in close contact with each other, and
the heat-resistant part is configured to
suppress transmission of heat, applied to the heat-resistant part during the welding, from the heat-resistant part to the functional part,
suppress reduction due to the heat in the holding force, and
maintain the state in which the functional part is held between the stator and the heat-resistant part.

8. The motor apparatus according to claim 1, wherein the heat-resistant part relaxes concentration of stress applied from the casing to the functional part.

9. The motor apparatus according to claim 8, wherein surface roughness of a surface of the heat-resistant part in contact with the functional part is smaller than surface roughness of an inner circumference surface of the casing.

10. The motor apparatus according to claim 8, wherein a profile of a surface of the heat-resistant part in contact with the functional part is lower than a profile of an inner circumference surface of the casing.

11. The motor apparatus according to claim 8, wherein surface hardness of a surface of the heat-resistant part in contact with the functional part is smaller than surface hardness of an inner circumference surface of the casing.

12. The motor apparatus according to claim 1, wherein the heat-resistant part is configured to hinder movement of one of the stator and the casing with respect to another of the stator and the casing in an axial direction.

13. The motor apparatus according to claim 1, wherein the heat-resistant part is configured to hinder rotation of one of the stator and the casing with respect to another of the stator and the casing.

14. A compressor including the motor apparatus according to claim 1.

15. A refrigeration apparatus including the compressor according to claim 14.

16. A motor apparatus comprising:

a casing;

a stator disposed in the casing, the stator including a plurality of protruding sections that protrude radially outward from an outer circumference of the stator;

a rotor disposed on an inner circumference of the stator;

a shaft disposed on an inner circumference of the rotor;

a plurality of functional parts disposed on outer circumferential surfaces of the plurality of protruding sections, respectively; and a plurality of heat-resistant parts disposed between each of the plurality of functional parts, respectively, and the casing.

17. The motor apparatus according to claim 16, wherein each of the plurality of functional parts includes an extension section that extends inward in a radial direction along an axial end surface of the stator or along a circumferentially facing surface of a respective protruding section among the plurality of protruding sections, each of the plurality of heat-resistant part includes an extension section that extends inward in the radial direction along the axial end surface or along the circumferentially facing surface of the respective protruding section such that the extension section of each of the plurality of functional parts is sandwiched between the stator and the extension section of a respective heat-resistant parts among the plurality of the heat-resistant parts.

* * * * *